Dec. 3, 1935.　　　　R. J. STIMSON　　　　2,023,254
SPRING SUSPENSION FOR VEHICLES
Filed Nov. 19, 1934　　　　3 Sheets-Sheet 1
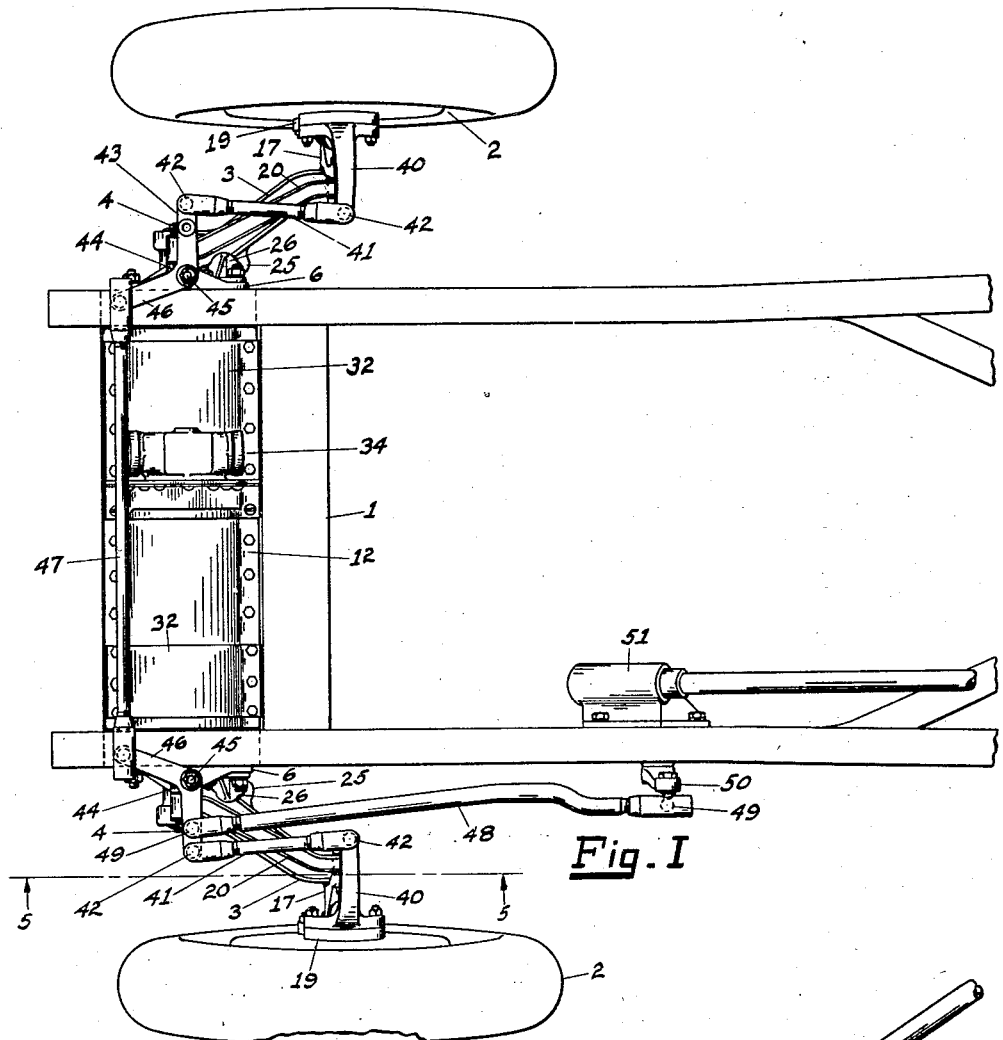
Fig. I
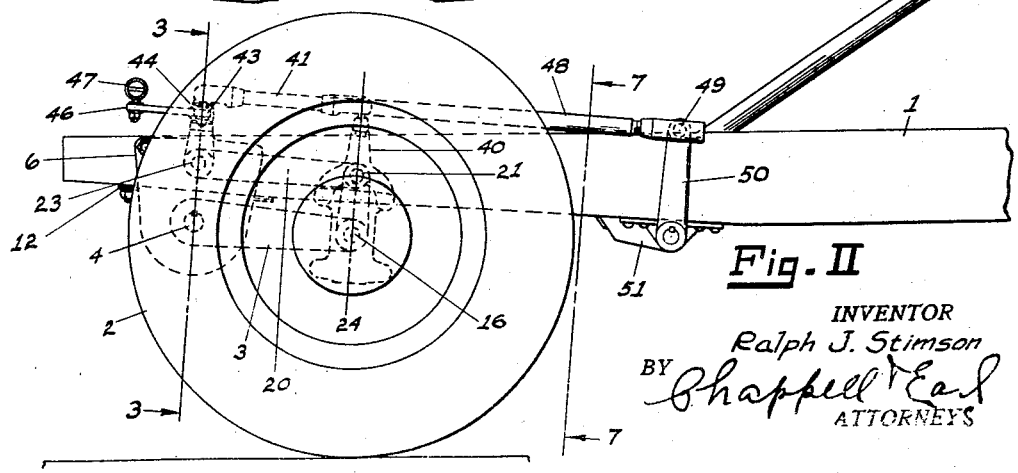
Fig. II
INVENTOR
Ralph J. Stimson
BY Chappell Earl
ATTORNEYS Dec. 3, 1935.                R. J. STIMSON                2,023,254
                    SPRING SUSPENSION FOR VEHICLES
              Filed Nov. 19, 1934           3 Sheets-Sheet 2
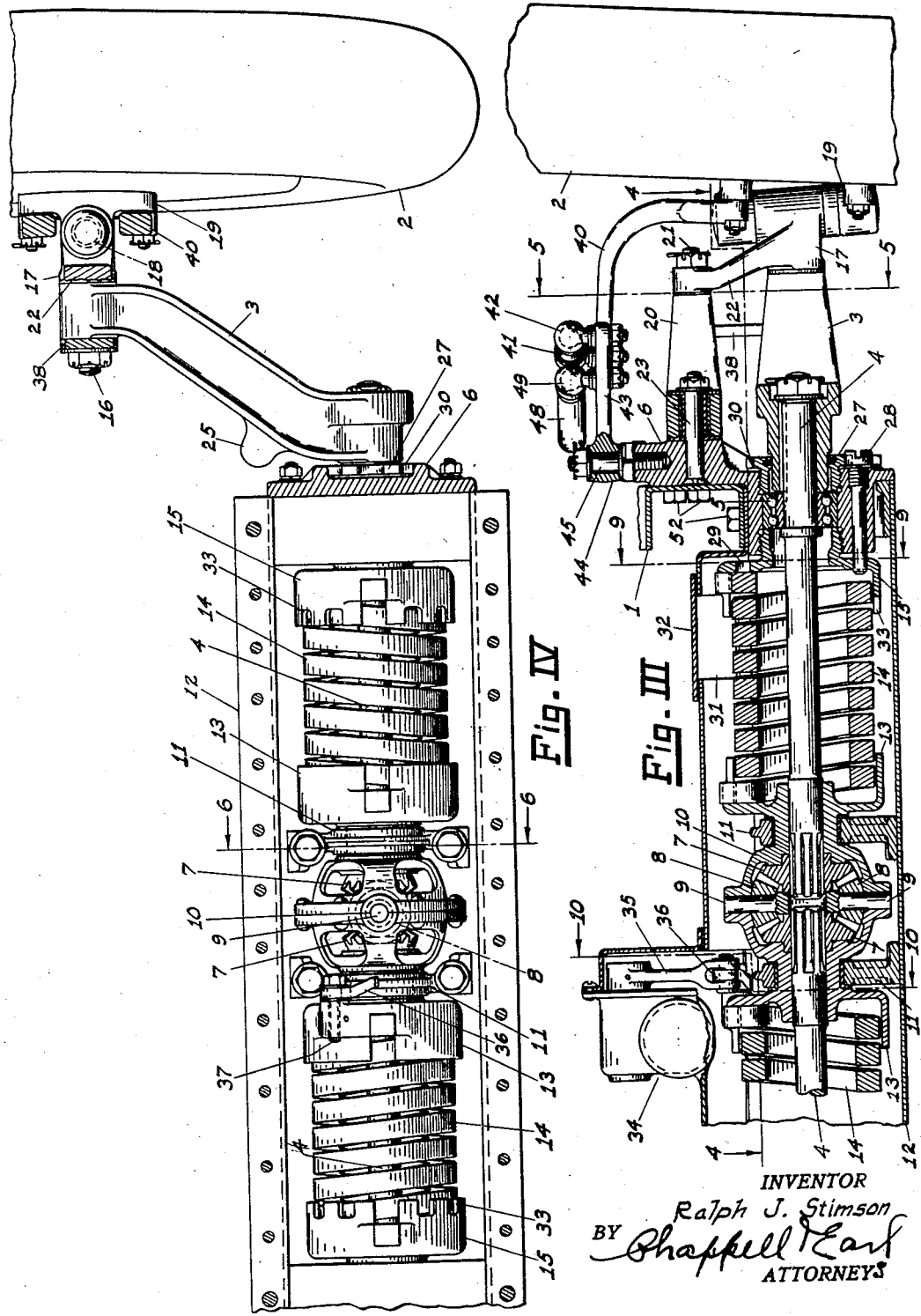
INVENTOR
Ralph J. Stimson
BY Chappell Earl
ATTORNEYS Dec. 3, 1935.    R. J. STIMSON    2,023,254
SPRING SUSPENSION FOR VEHICLES
Filed Nov. 19, 1934    3 Sheets-Sheet 3
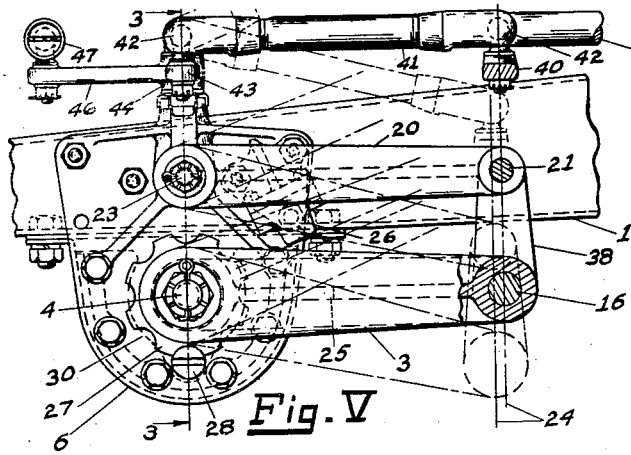
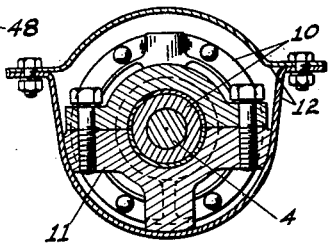
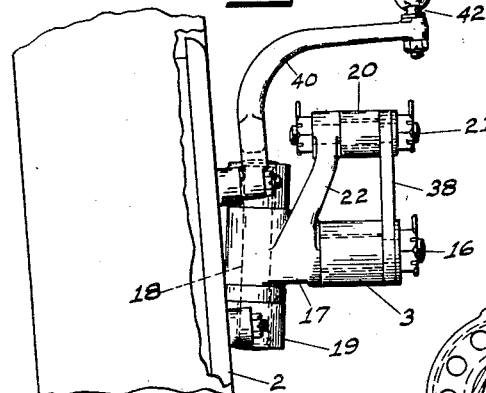
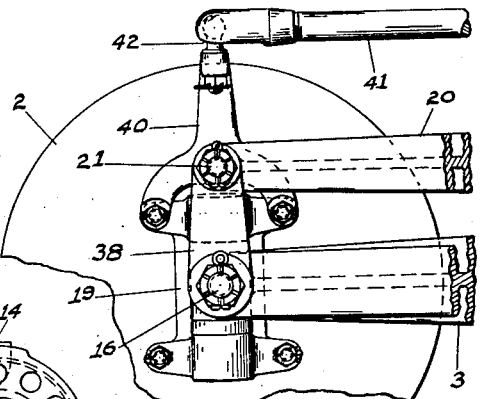
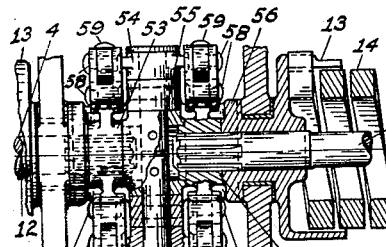
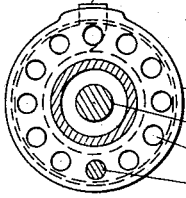
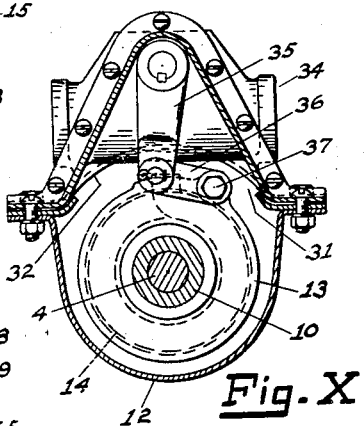
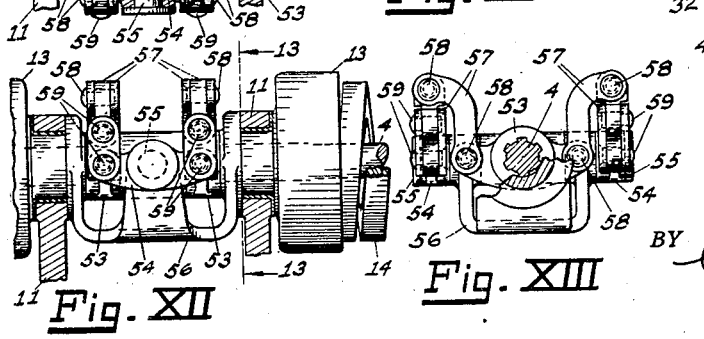
INVENTOR
Ralph J. Stimson
BY Chappell Earl
ATTORNEYS Patented Dec. 3, 1935

2,023,254

UNITED STATES PATENT OFFICE 2,023,254

SPRING SUSPENSION FOR VEHICLES

Ralph J. Stimson, Flint, Mich.

Application November 19, 1934, Serial No. 753,681

20 Claims. (Cl. 267—20)

The main objects of this invention are:

First, to provide an improved spring suspension for vehicles, which is adapted to keep the body of the vehicle on an even keel regardless of road level variations.

Second, to provide in a spring suspension unit of the foregoing character, cushioning means and compensating means which are independent in their action and cooperate to relieve the frame of the vehicle from traveling shocks and strains.

Third, to provide an improved "knee action" spring suspension for the front wheels of a motor vehicle.

Fourth, to provide an improved spring suspension having these advantages which does not detract from the appearance of the vehicle.

Fifth, to provide a spring suspension for vehicles which is simple and economical in its parts and very efficient and effective in operation.

Objects relating to details and economies of my invention will appear from the description to follow. The invention is defined and pointed out in the claims.

Embodiments of my invention are illustrated in the drawings, in which:

Fig. I is a fragmentary top plan view of the forward portion of a motor vehicle chassis embodying the features of my invention.

Fig. II is a fragmentary view in side elevation of the chassis.

Fig. III is an enlarged fragmentary view partially in front elevation and partially in section on a line corresponding to line 3—3 of Figs. II and V.

Fig. IV is a fragmentary view partially in top plan and partially in section on a line corresponding to line 4—4 of Fig. III.

Fig. V is an enlarged fragmentary view partially in side elevation and partially in transverse section on a line corresponding to line 5—5 of Figs. I and III, the movement of the parts being shown by broken lines.

Fig. VI is a view in transverse section taken on line 6—6 of Fig. IV.

Fig. VII is an enlarged fragmentary view in rear elevation taken from line 7—7 of Fig. II.

Fig. VIII is a fragmentary view in side elevation of the parts shown in Fig. VII.

Fig. IX is a partial view in transverse section taken on line 9—9 of Fig. III.

Fig. X is a view in transverse section taken on line 10—10 of Fig. III.

Fig. XI is a fragmentary top plan view of a modification, parts being broken away and shown in horizontal section.

Fig. XII is a view partially in front elevation and partially in section on a line corresponding to line 12—12 of Fig. XI.

Fig. XIII is a view partially in side elevation and partially in transverse section on line 13—13 of Fig. XII.

Referring to Figs. I to X of the drawings, 1 is the main frame of the vehicle, 2 the front wheels thereof, and 3 crank arms operatively associated with the frame and the wheels. The crank arms 3 are secured at their inner ends to shafts 4 which are rotatably mounted at their outer ends on bearings 5 in the brackets 6 which are secured to the side members of the frame 1. The inner end of each shaft is connected to a gear 7 of my compensating device which in the preferred form shown comprises a conventional type of differential mechanism. The gears 7 mesh with the equalizing pinions 8 which are rotatable on journals 9 secured to the casing 10 of the differential mechanism.

The casing 10 is rotatable in bearings 11 mounted within a housing 12 which is connected at its end to the brackets 6 and serves to support and protect the compensating device and the springing parts, the housing also being adapted to contain a lubricant for the parts. The casing 10 constitutes a spring actuating member and for this purpose terminates at its opposite ends in spring seats 13 which are yieldably connected to the brackets 6 by torsion springs 14, one end of each spring being adapted to turn with the member 10, and the other end being secured to a stationary spring seat 15 which has a projection threaded into the bracket 6.

The outer end of each of the arms 3 is pivoted on a stud 16 of a support member 17 which is connected by a pivot pin 18 to the axle or wheel spindle member 19 on which the wheel 2 rotates. The pivot pin 18 and its associated member form a knuckle joint permitting the wheel 2 to turn relative to the support member 17 in steering the vehicle.

A link 20 is pivoted at one end to a stud 21 on an upwardly projecting arm 22 of the support member 17 and at its other end to a stud 23 on the bracket 6, the link serving to prevent rotation of the support member 17 with the wheel 2 and to aid the arm 3 in resisting side thrusts. A tie bar 38 assists the support member 17 in holding the studs 16 and 21 in parallel relation.

The center lines of the shaft 4 and studs 23, 16 and 21 are arranged to form a parallelogram so that the arm 3 and link 20 oscillate to permit the wheel 2 to move vertically relative to the frame 1, the center line 24 of the pivot pin 18 remaining parallel to the line 3—3 for all positions of the wheel as shown by the broken lines of Fig. V.

With the foregoing arrangement, the wheels 2 are free to rise and fall either in unison or individually in passing over obstructions, the differential mechanism acting to compensate for any variation in the relative positions of the wheels. If both wheels pass over obstructions of the same height, the shafts 4 are turned an equal amount in the same direction and no action is imparted to the differential gears which turn in unison with the casing 10 and impart the force of the impact to the springs 14.

On the other hand, if the wheels pass over obstructions of unequal heights so that one of the wheels is lifted higher than the other, the differential gears compensate for the difference in turning of the shafts 4 and the mean of the movements of the two shafts is imparted to the springs 14. With the wheels 2 free to adapt themselves to varying heights, the forward end of the frame 1 is in effect supported at a single point which cooperates with the two other points of support such as with the two rear wheels, not shown, to provide a three-point suspension for the frame and other rigid parts of the chassis which consequently will not be distorted by any change in the relative position of the wheels.

The upward movement of each of the arms 3 is prevented from exceeding a predetermined limit by means of a lug 25 on the side of each arm and a stop 26 is secured to the bracket 6 and is preferably made of yielding material. The arm is shown in contact with the stop by the broken lines of Fig. V.

The tension of the springs 14 and the height of the frame 1 are adjusted by turning the outer ends of the springs and their corresponding seats 15 in the brackets 6. In the illustrated embodiment, the threaded portion of the seat 15 cooperates with a clamping screw 27 to hold the bearing 5 in place. The spring seat 15 and screw 27 are locked by means of a lock pin 28 which is threaded into the brackets 6 and projects into one of a series of holes 29 in the spring seat, the head of the pin engaging one of a series of notches 30 in the head of the screw 27.

With the lock pin 28 removed, the screw 27 loosened, the outer ends of the arms 3 supported as by the wheels 2, and the desired load on the brackets 6, the spring seats 15 are adjusted to give the correct tension to the springs 14. The clamping screw 27 is then tightened, and the parts locked in position by the pin 28. To facilitate possible adjustment of the springs after final assembly, I provide openings 31 in the upper part of the housing 12 providing access to the spring seats 15, the openings being covered by removable plates 32. The inner edges of the seats are provided with notches 33 facilitating their turning with a suitable tool or wrench.

In order to prevent too rapid recoil of the springs 14, I provide a rebound check 34 connected to the spring actuating member 10, the actuating arm 35 of the check being connected by a link 36 to the stud 37 on one of the spring seats 13. The base of the rebound check preferably constitutes one of the cover plates 32, as shown.

Each of the axle members 19 is provided with an upwardly projecting and inwardly extending steering arm 40 which is connected by a link 41 and universal joints 42 to one arm 43 of a bell crank lever 44 which is pivoted on a stud 45 at the top of each of the brackets 6. The forwardly projecting arms 46 of the two bell crank levers are connected by the tie rod 47 which is disposed above and in transverse relation to the frame 1, the ends of the rod being pivoted to the ends of the arms of the bell crank levers. The arm 43 of one of the bell crank levers is connected by a link 48 and universal joints 49 to the arm 50 of the steering gear 51.

With the foregoing arrangement, actuation of one of the bell crank levers 44 by the link 48 imparts a corresponding movement to the other lever and turns the wheels 2 in unison to steer the vehicle. The universal joints 42 permit the steering arm 40 to move up and down with the wheel 2, the link 41 being preferably so arranged as to be parallel with the arm 3 and the link 20 when the wheel is in the straight ahead position. Thus, the steering control is practically unaffected by the rising and falling of the wheels.

With the steering connections located above the frame, as shown ground clearance is considerably greater than with the usual arrangement of parts wherein the tie bar is disposed below the frame and the individual wheel springing units are disposed at the sides of the frame.

With my arrangement of parts, the complete mounting of the two wheels including the compensating and springing mechanism and the steering connections may be manufactured and assembled as a single unit and quickly assembled with the frame 1 and secured as by the bolts 52. Obviously, my compensating and springing means can be applied to the rear or other non-steering wheels by omitting the steering connections and the knuckle joints on the support members 17, the latter being rigidly connected to the axle members 19.

Referring to Figs. XI, XII, and XIII, I show another compensating mechanism wherein each of the shafts 4 is provided at its inner end with a double-armed member 53 adapted to turn therewith. The spring actuating member 56 is provided with opposed studs 55 which are connected to the members 53 by levers 54. Each arm of each of the members 53 is connected to one end of one of the equalizing levers 54 by a curved link 57 in which the joints 58 permit the arms of the members 53 to oscillate. With this arrangement, the shafts 4 can be turned an amount sufficient for the required range of movement of the arms 3.

From the foregoing description of my invention, it will be apparent to those skilled in the art that I provide compensating means for travel over uneven surfaces which relieves the frame, body and other rigid parts of the vehicle from strains and distortion. I also provide improved cushioning or springing means which is compactly arranged and enclosed together with the compensating means. I also provide independence between the action of the compensating means and that of the springing means in order that the spring tension may offer no resistance to the compensating action and in order that the latter action may have no effect upon the proper functioning of the springs.

I have illustrated and described my improvements in embodiments which I have found very practical. I have not attempted to illustrate or describe other embodiments or adaptations as it is believed this disclosure will enable those skilled in the art to embody or adapt my improvements as may be desired.

Although I have shown and described, certain specific embodiments of my invention, I am fully aware that many modifications thereof are possible. My invention, therefore, is not to be restricted except insofar as is necessitated by the prior art and by the spirit of the appended claims.

Having thus described my invention, what I claim as new and desire to secure by Letters Patent, is:

1. In a vehicle, the combination with a frame including side members and spaced pairs of front and rear wheels carrying said frame, of a pair of opposed brackets mounted under the side members of said frame, a substantially cylindrical housing disposed between said brackets, spaced bearing members mounted centrally of said housing, a spring actuating member rotatable in said bearing members and having spring seats at its ends, stationary spring seats at the inner sides of said brackets, coiled torsion springs having their ends connected to said spring seats, spaced shafts rotatable in said brackets and spring actuating member, a differential gear mechanism connecting the inner ends of said shafts to said spring actuating member, and rearwardly and outwardly extending crank arms fixed to the outer ends of said shafts and connected to said front wheels.

2. In a vehicle, the combination with a frame including side members and front wheels, of a pair of opposed brackets mounted under the side members of said frame, a housing disposed between said brackets, spaced bearing members mounted in said housing, a spring actuating member rotatable in said bearing members and having spring seats at its ends, stationary spring seats at the inner sides of said brackets, coiled torsion springs having their ends connected to said spring seats, spaced shafts rotatable in said brackets and spring actuating member, a differential mechanism connecting the inner ends of said shafts to said spring actuating member, and rearwardly and outwardly extending crank arms fixed to the outer ends of said shafts and connected to said front wheels.

3. In a vehicle, the combination with a frame and a pair of wheels, of a pair of opposed brackets on said frame, a housing disposed between said brackets, spaced bearing members mounted centrally of said housing, a spring actuating member rotatable in said bearing members and having spring seats at its ends, stationary spring seats at the inner sides of said brackets, coiled torsion springs having their ends connected to said spring seats, spaced shafts rotatable in said brackets and spring actuating member, a differential mechanism connecting the inner ends of said shafts to said spring actuating member, and crank arms fixed to the outer ends of said shafts and connected to said wheels.

4. In a vehicle, the combination with a frame and a pair of wheels, of a pair of opposed brackets on said frame, a housing disposed between said brackets, a spring actuating member having spring seats at its ends, stationary spring seats at the inner sides of said brackets, coiled torsion springs having their ends connected to said spring seats, spaced shafts rotatable in said brackets and spring actuating member, a differential mechanism connecting said shafts to said spring actuating member, and crank arms fixed to the outer ends of said shafts and connected to said wheels.

5. In a spring suspension unit for vehicles, the combination with a substantially cylindrical housing having spaced central and end bearings, of inwardly facing stationary spring seats at the inner sides of said end bearings, a differential mechanism having a floating casing journaled to said central bearings and having outwardly facing spring seats, coiled torsion springs disposed between said inwardly and outwardly facing spring seats, shafts journaled to said casing at their inner ends and to said end bearings at their other ends, the inner ends of said shafts being connected to said differential mechanism, substantially horizontal crank arms fixed to the outer ends of said shafts, and wheels connected to the outer ends of said crank arms.

6. In a spring suspension unit for vehicles, the combination with a substantially horizontal housing having spaced central and end bearings, of inwardly facing spring seats at the inner sides of said end bearings, a differential mechanism having a floating casing journaled to said central bearings and having outwardly facing spring seats, torsion springs disposed between said inwardly and outwardly facing spring seats, shafts journaled to said casing at their inner ends and to said end bearings at their other ends, the inner ends of said shafts being connected to said differential mechanism, crank arms fixed to the outer ends of said shafts, and wheels connected to the outer ends of said crank arms.

7. In a spring suspension unit for vehicles, the combination with a housing having spaced central and end bearings, of a compensating mechanism having a casing journaled to said central bearings, torsion springs disposed within said housing at opposite ends of said casing and being connected to the casing at one end and to the housing at the other end, shafts journaled to said casing at their inner ends and to said end bearings at their other ends, the inner ends of said shafts being connected to said compensating mechanism, crank arms fixed to the outer ends of said shafts, and wheels connected to the outer ends of said crank arms.

8. In a spring suspension unit for vehicles, the combination with a housing having end bearings, of a compensating mechanism having a casing, torsion springs disposed within said housing at opposite ends of said casing and being connected to the casing at one end and to the housing at the other end, shafts journaled to said casing at their inner ends and to said end bearings at their other ends, the inner ends of said shafts being connected to said compensating mechanism, crank arms fixed to the outer ends of said shafts, and wheels connected to the outer ends of said crank arms.

9. In a vehicle, the combination with a frame, and a pair of front wheels, of a substantially cylindrical transverse housing mounted under the front end of said frame, a differential mechanism arranged in the center of said casing with its casing rotatably mounted therein and having oppositely facing spring seats, spaced shafts rotatably mounted at their inner ends in said casing and at their outer ends in said housing, the inner ends of the shafts being connected by said differential mechanism, substantially horizontal rearwardly extending crank arms connecting the outer ends of said shafts to said wheels, coiled torsion springs connecting said spring seats to the opposite ends of said housing, and means positioned above said arms for steering the vehicle through said front wheels.

10. In a vehicle, the combination with a frame, and a pair of wheels, of a transverse housing mounted under the front end of said frame, a differential mechanism arranged in said casing with its casing rotatably mounted therein and having oppositely facing spring seats, spaced shafts rotatably mounted at their inner ends in said casing and at their outer ends in said housing, the inner ends of the shafts being connected by said differential mechanism, substantially horizontal rearwardly extending crank arms connecting the outer ends of said shafts to said wheels, torsion springs connecting said spring seats to the opposite ends of said housing, and means positioned above said arms for steering the vehicle through said wheels.

11. In a vehicle, the combination with a frame, and a pair of wheels, of a differential mechanism having a casing provided with oppositely facing spring seats, spaced shafts rotatably mounted at their inner ends in said casing, the inner ends of the shafts being connected by said differential mechanism, crank arms connecting the outer ends of said shafts to said wheels, coiled torsion springs connecting said spring seats to opposite sides of said frame, and means positioned above said arms for steering the vehicle through said wheels.

12. In a vehicle, the combination with a frame, and a pair of wheels, of a differential mechanism having a casing, spaced shafts rotatably mounted at their inner ends in said casing, the inner ends of the shafts being connected by said differential mechanism, crank arms connecting the outer ends of said shafts to said wheels, coiled torsion springs connecting said casing to opposite sides of said frame, and means positioned above said arms for steering the vehicle through said wheels.

13. In a vehicle, the combination with a frame, and a pair of wheels, of a differential mechanism having a casing, spaced shafts rotatably mounted at their inner ends in said casing, the inner ends of the shafts being connected by said differential mechanism, crank arms connecting the outer ends of said shafts to said wheels, and coiled torsion springs connecting said casing to opposite sides of said frame.

14. In a vehicle, the combination with a frame, and a pair of wheels, of a pair of substantially horizontal crank arms connecting said wheels to opposite sides of said frame, means including a differential mechanism connecting said crank arms, spring means anchored to said frame, and a spring actuating member connecting said differential mechanism to said spring means, the arrangement being such that said spring means constitutes a shock absorber of all load forces acting between the frame and wheels, the differential mechanism acting to compensate vertical movement of one wheel relative to said frame by an equal and opposite movement of the other wheel.

15. In a vehicle, the combination with a frame, and a pair of wheels, of a pair of substantially horizontal crank arms connecting said wheels to opposite sides of said frame, and means including a differential mechanism connecting said crank arms, the differential mechanism acting to compensate vertical movement of one wheel relative to said frame by an equal and opposite movement of the other wheel, and shock absorbing means connecting said differential mechanism to said frame.

16. In a vehicle, the combination with a frame, and a pair of wheels, of a pair of shafts rotatably connected to said frame, a pair of substantially horizontal crank arms connecting the outer ends of said shafts to said wheels, a differential gear mechanism connecting the inner ends of said shafts and including a floating casing, and spring means connecting said casing to said frame and acting to resiliently resist rotational movement of the casing relative to the frame.

17. In a vehicle, the combination with a frame, and a pair of wheels, of a pair of shafts rotatably connected to said frame, a pair of crank arms connecting the outer ends of said shafts to said wheels, a differential mechanism connecting the inner ends of said shafts, and spring means acting to resiliently resist rotational movement of the shafts relative to the frame.

18. An automotive vehicle chassis comprising a frame and two wheels, the wheels being arranged at opposite sides of the frame, a spaced pair of shafts rotatably connected to said frame, said shafts being in transverse alinement relative to the frame, normally horizontal cranks connecting the outer ends of said shafts to said wheels, there being a shaft and crank for each wheel, differential compensating means connecting together the inner ends of said shafts, and spring cushioning means connecting said last named means to said frame, the arrangement being such that the chassis travels at a substantially even keel regardless of road level variations, shocks being absorbed by said cushioning means.

19. The combination with a vehicle frame and a pair of wheels, of a pair of alined rockshafts, wheel carrying arms on said rockshafts, a differential gear mechanism connecting said rockshafts, coiled springs connected at one end to another element of said differential mechanism, the other ends of said springs being connected to relatively fixed supports, and a common housing for said rockshafts, differential mechanism and springs.

20. The combination with a vehicle frame and a pair of wheels, of a pair of alined rockshafts, wheel carrying arms on said rockshafts, a differential gear mechanism connecting said rockshafts, and coiled springs connected at one end to another element of said differential mechanism, the other ends of said springs being connected to relatively fixed supports.

RALPH J. STIMSON.